United States Patent
Augustine

[19]

[11] Patent Number: 5,526,622
[45] Date of Patent: Jun. 18, 1996

[54] TRAILER SIDE PANEL ASSEMBLY

[76] Inventor: Terrence E. Augustine, 6851 Housekeeper Rd., Pemberville, Ohio 43450

[21] Appl. No.: 81,656

[22] Filed: Jun. 22, 1993

[51] Int. Cl.⁶ .................................................. E04C 1/00
[52] U.S. Cl. ........................................ 52/309.9; 52/309.1
[58] Field of Search .............................. 52/309.9, 309.4, 52/309.1; 156/331.7

[56] References Cited

U.S. PATENT DOCUMENTS

| | | |
|---|---|---|
| 3,692,349 | 9/1972 | Ehrlich . |
| 3,778,528 | 12/1973 | Heifetz et al. ............ 52/309.9 |
| 3,788,682 | 1/1974 | Ehrlich . |
| 3,989,157 | 11/1976 | Veenema . |
| 4,042,275 | 8/1977 | Glassmeyer et al. . |
| 4,212,405 | 7/1980 | Schmidt . |
| 4,252,067 | 2/1981 | Stark . |
| 4,256,797 | 3/1981 | Stamar et al. ............ 264/320 |
| 4,422,558 | 12/1983 | Mittelmann et al. . |
| 4,685,721 | 8/1987 | Banerjea . |
| 4,774,794 | 10/1988 | Grieb .................... 52/309.9 |
| 4,810,027 | 3/1989 | Ehrlich . |
| 4,904,328 | 2/1990 | Beeler et al. ............ 156/331.7 X |
| 5,058,756 | 10/1991 | Green . |
| 5,072,845 | 12/1991 | Grogan . |
| 5,141,122 | 8/1992 | Grogan . |
| 5,154,302 | 10/1992 | Alcorn . |

Primary Examiner—Wynn E. Wood
Assistant Examiner—Creighton Smith
Attorney, Agent, or Firm—Marshall & Melhorn

[57] ABSTRACT

A removable, replaceable and interchangeable trailer side panel assembly comprises a substantially rectangular panel body formed of a foamed plastic core having a layer of a plastic containing film adhered to each of the major surfaces thereof, and a rigid framing member secured to at least two opposing edges of the panel body. The side panel assemblies in accordance with the invention may be combined to form a flat bed trailer side panel container assembly. The side panels of the invention retain their dimensional stability, are practically maintenance free, last considerably longer and are significantly lighter than the replaceable side panels used previously.

21 Claims, 1 Drawing Sheet

TRAILER SIDE PANEL ASSEMBLY

BACKGROUND OF THE INVENTION

1. Field of the Invention

The invention relates to a side panel assembly and, more particularly, to a side panel assembly for a flat bed semi-trailer.

2. Summary of Related Art

Various methods for the construction of semi-trailer side walls have been used. Typically, the side walls are formed of continuous sheets of aluminum and are stiffened by internal or external vertical side posts. Unitary plywood panels, coated on either face with fiberglass-reinforced polyester, have also been used to form the side walls of cargo-carrying containers and trailer bodies in conjunction with aluminum structural members to which the edges of the plywood panels are secured by bolts.

On the other hand, it is often desired that the side walls be removable and replaceable so that the trailer may be loaded from the sides and then the side walls replaced, or so that the trailer can be run flat for wide loads. Such side walls have heretofore been formed of a plurality of side panels, each consisting of a sheet of plywood which is supported at its bottom edge by the trailer flooring, and at the opposing side edges in channels formed in aluminum framing members mounted vertically about the periphery of the trailer bed. In some instances, these plywood panels have been provided with a coating of fiberglass-reinforced plastic on both sides. However, there are considerable disadvantages with the plywood side panels used previously: they have substantial weight, lack dimensional stability, often quickly become aesthetically objectionable, and require excess maintenance and early replacement due to the natural deterioration of the wood.

SUMMARY OF THE INVENTION

The present invention relates to a trailer side panel assembly comprising a substantially rectangular panel body formed of a foamed plastic core having a layer of a plastic containing film adhered to each of the major surfaces thereof, and a rigid framing member secured to at least two opposing edges of the panel body.

The side panel assemblies in accordance with the invention may be combined to form a flat bed trailer side panel container assembly. The container assembly more particular comprises a generally horizontally disposed flat bed with a plurality of mounting means disposed about the periphery thereof. A plurality of elongate support posts are mounted generally vertically to the flat bed in the mounting means, each of the support posts including at least one channel extending along the length thereof. A plurality of side panels are supported in the support posts. Each of the side panels comprises a substantially rectangular panel body formed of a foamed plastic core having a plastic containing film adhered to each of the major surfaces thereof and a rigid framing member secured to at least two opposing edges of said panel body. Each of the two oppositely disposed framing members of each of the side panels slidably engage a channel in an associated one of the support posts.

The novel construction of the present invention provides a trailer side panel which is easily removable, replaceable and interchangeable. The side panel of the invention is significantly lighter than the prior art plywood side panel. Therefore, a trailer container assembly formed with these side panels can be set up and taken down more easily and in less time. The side panels of the invention also retain their dimensional stability, are practically maintenance free, and last considerably longer than the replaceable side panels used previously.

BRIEF DESCRIPTION OF THE DRAWINGS

The above, as well as other advantages of the present invention, will become readily apparent to those skilled in the art from the following detailed description of a preferred embodiments when considered in the light of the accompanying drawings, in which.

DESCRIPTION OF THE PREFERRED EMBODIMENTS

Figure 1:
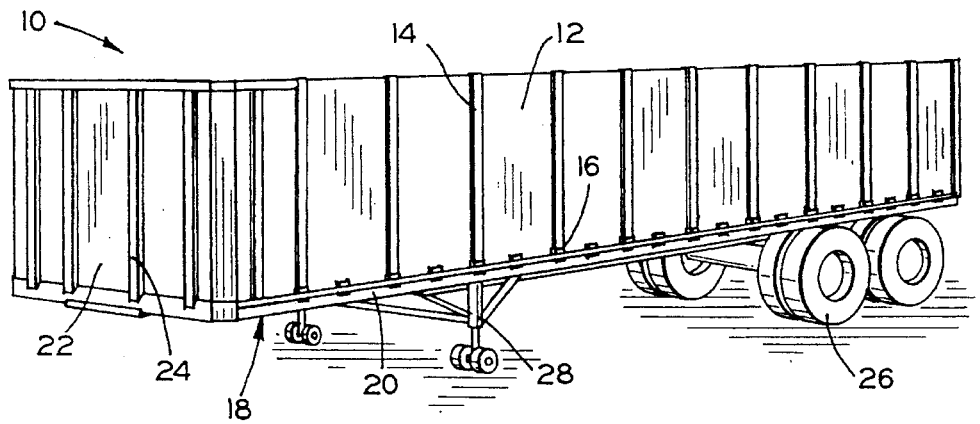
FIG. 1 is a perspective view of a flat bed trailer provided with a trailer side panel container assembly in accordance with the present invention.

Referring now to the drawings, there is illustrated in FIG. 1 a flat bed trailer 10 provided with a trailer side panel container assembly in accordance with the present invention. The trailer container assembly includes a plurality of removable, replaceable and interchangeable side panels 12 which are held in position by vertically disposed support posts 14 mounted in post pockets 16 secured to side support beams 18 about the periphery of the trailer bed 20. The front of the trailer 10 includes a bulkhead 22 supported by reinforcing beams 24 welded thereto. The trailer 10 is also provided with the usual wheels 26 and landing gears 28. The top of the trailer 10 may be provided with a series of tarpaulin bows (not shown) mounted in the support posts 14 to which a tarpaulin (not shown) may be secured.

Each of the individual side panels 12 is comprised of a substantially rectangular panel body 29 formed of a foamed plastic core 30 and two layers 32 and 33 of a plastic containing film, one of which is adhered to each of the major surfaces of the core 30. The core 30 may be formed of any suitable foamed plastic material having sufficient dimensional stability and strength. Preferably, the core 30 is formed of expanded polystyrene. The density of a core 30 formed of expanded polystyrene is preferably between about 3 to 4 lbs/ft$^3$, and is most preferably from about 3.2 to 3.5 lbs/ft$^3$, after lamination.

The plastic containing films 32 and 33 are preferably comprised of a fiberglass-reinforced polyester material, such as the fiberglass-reinforced polyester films available commercially from Sequentia, Inc. of Cleveland, Ohio. The films 32 and 33 are laminated to the core 30 using conventional pressing techniques and a suitable adhesive. Polyurethane/isocyanate adhesives have been found to be particularly effective to bond the films 32 and 33 to the core 30. One such adhesive is the Fasson polyurethane/isocyanate adhesive available commercially from Avery International.

The plastic containing films 32 and 33 may be provided with a smooth side and a textured side. The films 32 and 33 are preferably positioned so that the smooth side faces the foam core 30 to enhance adhesion between the two, while the outwardly facing textured sides help to conceal any defects which may be present in the surface of the foam core 30. This enhances the aesthetic appeal of the side panel 12. In addition, the plastic containing films 32 and 33 may include colorants to provide a panel body 29 of any color desired. As the colorant is provided throughout the film, the panel body 29 advantageously retains its original color despite the normal wear and tear.

The marginal edges of the panel body 29 are provided with rigid, generally U-shaped framing members 34 to provide dimensional stability to the side panel 12. Preferably, the panel body 29 is provided with a separate framing member 34 secured along each of its four edges, with each of the framing members 34 provided with mitered corners. In a preferred embodiment, each of the four corners of the panel body 29 is further reinforced with a stainless steel L-shaped bracket 36 secured along the edges of the panel body 29 and between the panel body 29 and the framing members 34, as shown in FIG. 2.

Figures 2, 3:
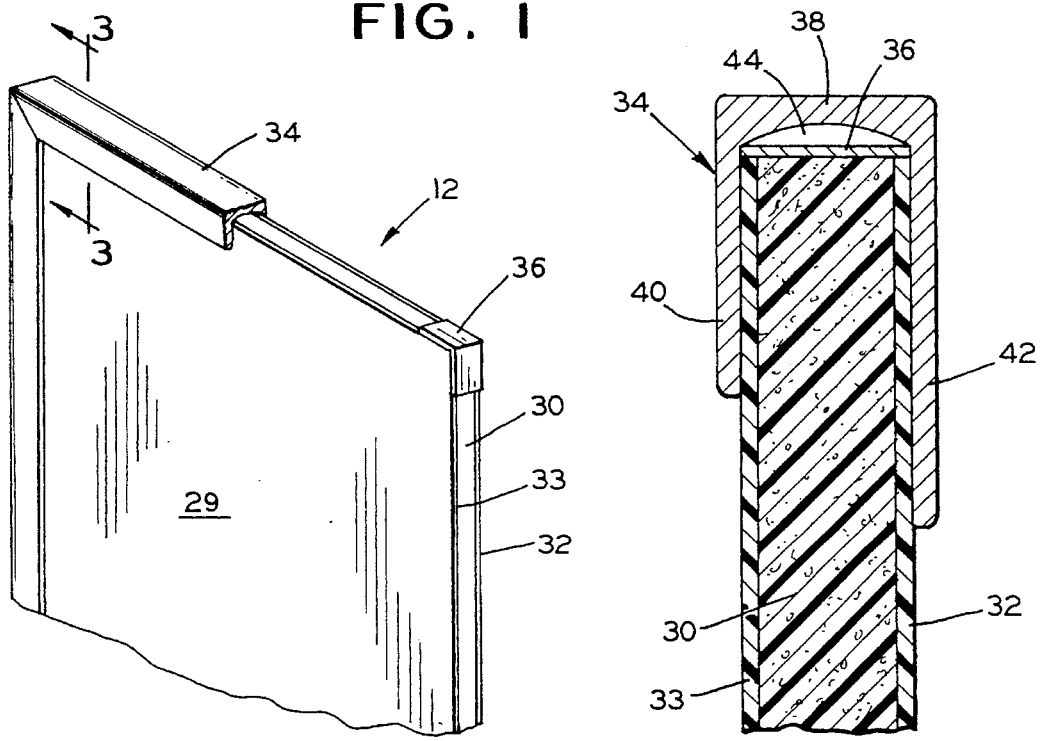
FIG. 2 is a perspective view, with portions broken away, of a portion of the side panel of the present invention.
FIG. 3 is a sectional view, taken along line 3—3 of FIG. 2, of the side panel.

In a preferred embodiment, as best seen in FIG. 3, the framing members 34 comprise an uneven leg channel having a base 38, a shorter leg 40 and a longer leg 42, the length of the base 38 being such that the panel body 29 must be force fit into the framing member 34. As will be appreciated, the uneven lengths of the legs 40 and 42 makes it more difficult to pull the framing member 34 away from the edge of the panel body 29. In addition, the base 38 of the framing members 34 is preferably slightly concave to provide a small reservoir 44 for the adhesive which may be used to bond the framing members 34 to the panel body 29 and L-shaped brackets 36. The framing members 34 may be formed of any sufficiently strong, rigid material, but are preferably formed of extruded aluminum.

In making the side panel 12 in accordance with the present invention, a suitable adhesive is applied to both sides of the foam core 30, which is typically about ½" thick. A sheet of the plastic-containing film is applied to each side of the foamed plastic core 30 and a hydraulic press is used in the conventional manner to bond the plastic-containing films 32 and 33 to the foam core 30, and to reduce the entire panel body 29 to the desired thickness. The panel body 29 may then be cut to the desired length and width.

The L-shaped brackets 36 are then positioned on the marginal edges of the panel body 29 at each of the corners thereof. An adhesive is applied to either the interior of the framing members 34 or the marginal edges of the panel body 29, a framing member 34 is press fit onto each of the marginal edges of the panel body 29, and the adhesive is allowed to set.

Figure 4:
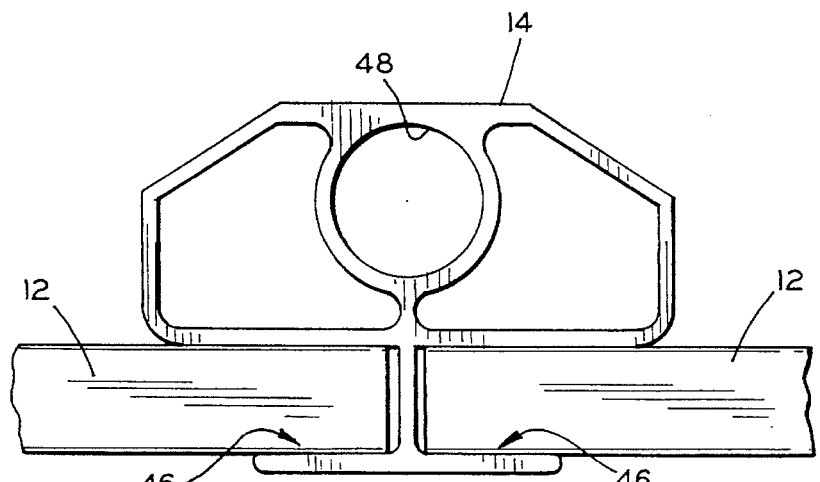
FIG. 4 is a enlarged top view of a portion of the side panel container assembly illustrated in FIG. 1.

To form a flat bed trailer side panel container assembly including the side panels 12 of the present invention, support posts 14 are mounted in the post pockets 16 secured to the side support beams 18 about the periphery of the trailer bed 20. The support posts are preferably formed of extruded aluminum and, as best seen in FIG. 4, are provided with a pair of channels 46 extending along the length thereof. The support posts 14 may also be provided with a means, such as the bore 48, for supporting the end of a tarpaulin bow.

The side panels 12 are mounted to the trailer 10 between two of the support posts 14, the framing members 34 secured to the two opposing edges of the panel body 29 each slidably engaging one of the channels 46 in each of the support posts 14. The framing member 34 therebetween rests on the floor of the trailer bed 20. Additional side panels 12 are mounted in a like manner about the periphery of the trailer bed 20, and may be used to enclose all or only a portion of the space above the bed 20.

The novel construction of the present invention thus provides a trailer side panel which is easily removable, replaceable and interchangeable. The side panel 12 is significantly lighter than the plywood side panels previously used. Therefore, a trailer side panel container assembly formed with the side panels 12 can be set up and taken down more easily and in less time. The side panels of the invention also retain their dimensional stability, are practically maintenance free, and last considerably longer than the replaceable side panels used previously.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A trailer side panel assembly comprising:
   a) a substantially rectangular panel body having a pair of opposed major surfaces and including four side edges extending therebetween, said panel body being formed of a foamed plastic core having a plastic film adhered to both of the major surfaces thereof; and
   b) a rigid framing member secured to each of the side edges of said panel body.

2. A side panel assembly as defined in claim 1, wherein said core is comprised of expanded polystyrene.

3. A side panel assembly as defined in claim 1, wherein the density of said foamed plastic core is from about 3 to 4 lbs/ft$^3$.

4. A side panel assembly as defined in claim 1, wherein each of said framing members is comprised of a generally U-shaped molding.

5. A side panel assembly as defined in claim 4, wherein each of said framing members is comprised of an uneven leg molding.

6. A side panel assembly as defined in claim 4, wherein said framing members are comprised of extruded aluminum.

7. A side panel assembly as defined in claim 1, wherein said plastic containing film is comprised of a fiberglass reinforced plastic.

8. A side panel assembly as defined in claim 1, wherein said plastic containing film is comprised of a fiberglass reinforced polyester.

9. A side panel assembly as defined in claim 1, further comprising an adhesive interposed between said core and each of said layers of plastic containing film.

10. A side panel assembly as defined in claim 9, wherein a polyurethane/isocyanate adhesive is interposed between said core and each of said layers of plastic containing film.

11. A side panel assembly as defined in claim 1, wherein said panel body includes four corners and said side panel assembly further comprises a generally flat, L-shaped bracket secured along the marginal edge of said panel body at each of the corners thereof and between said panel body and said framing members.

12. A side panel assembly as defined in claim 1, wherein said L-shaped brackets are comprised of stainless steel.

13. A side panel assembly as defined in claim 1, further comprising an adhesive interposed between said panel body and each of said framing members.

14. A flat bed trailer side panel container assembly comprising:
   a) a generally horizontally disposed flat bed;
   b) a plurality of elongate support posts having an axis and mounted generally vertically about the periphery of said flat bed, each of said support posts including at least one axially extending channel formed therein;

c) a plurality of side panels, each comprising a substantially rectangular panel body having a pair of opposed major surfaces and including four side edges extending therebetween, each of said panel bodies being formed of a foamed plastic core having a plastic film adhered to each of the major surfaces thereof and a rigid framing member secured to each of the side edges of said panel body, each of said side panels being supported with two of the side edges thereof being disposed within the channel formed in an associated one of said support posts.

15. A side panel assembly as defined in claim 14, wherein said support posts are comprised of extruded aluminum.

16. A side panel assembly as defined in claim 14, wherein said plastic containing film is comprised of a fiberglass reinforced plastic.

17. A side panel for a flat bed trailer side panel container assembly of the type including a generally horizontally disposed flat bed having a plurality of mounting means disposed about the periphery of said flat bed, and a plurality of elongate support posts mounted generally vertically to said flat bed in said mounting means, each of said support posts including at least one channel extending along the length thereof adapted to retain the edge of a side panel, the side panel comprising:

a) a substantially rectangular panel body formed of a foamed plastic core having a layer of a plastic containing film adhered to both of the major surfaces thereof; and b) a rigid framing member secured to each of the marginal edges of said panel body.

18. A side panel assembly as defined in claim 17, wherein said plastic containing film is comprised of a fiberglass reinforced plastic.

19. A side panel assembly as defined in claim 17, wherein said core is comprised of expanded polystyrene.

20. A side panel container assembly as defined in claim 14, wherein one side edge of each of said side panels is supported on said flat bed.

21. A side panel for a trailer side panel container assembly including a generally horizontally disposed bed having a plurality of elongate support posts mounted generally vertically thereto, each of said support posts including at least one channel extending along the length thereof and adapted to retain the edge of a side panel, the side panel comprising:

a panel body having a pair of opposed major surfaces with a peripheral edge therebetween, said panel body being formed of a foamed plastic core having a plastic film adhered to both of the major surfaces thereof; and a rigid frame secured to said panel body and extending about substantially the entire peripheral edge thereof.

* * * * *